3,202,687
PURIFICATION OF ALPHA-BRANCHED SATURATED MONOCARBOXYLIC ACIDS WITH A CHELATING AGENT
Johan M. Vos, Gosling R. Schuursma, and Cornelis Groot, all of Amsterdam, Netherlands, assignors to Shell Oil Company, New York, N.Y., a corporation of Delaware
No Drawing. Filed Mar. 28, 1961, Ser. No. 98,766
Claims priority, application Netherlands, Apr. 7, 1960, 250,282
3 Claims. (Cl. 260—419)

This invention relates to the purification of alpha-branched monocarboxylic acids. The invention relates more particularly to the recovery and purification of crude reaction mixtures comprising alpha-branched monocarboxylic acids obtained by the reaction of olefins with carbon monoxide and water in the presence of a catalyst comprising admixed phosphoric acid, boron trifluoride and water, or an admixture of boron trifluoride and water.

Relatively recently it was found that fatty acids, consisting essentially of alpha-branched saturated monocarboxylic acids, are readily obtained at relatively moderate conditions of temperature and pressure from olefins, carbon monoxide and water with the aid of a catalyst comprising phosphoric acid, boron trifluoride and water, or one comprising boron trifluoride and water. The reaction is carried out in the liquid phase, at a temperature in the range of from about −25 to about 100° C. Generally temperatures in the range of from about −10 to about 80° C. are preferably employed. The reaction is executed at relatively low pressures, for example, in the range of from about 20 to about 150 atmospheres. Suitable methods of preparing the carboxylic acid-containing reaction products, to the recovery and purification of which the present invention is directed, are disclosed in U.S. Patent 2,876,241 and in copending applications Serial Nos. 858,609; 858,796 and 858,797, filed December 10, 1959 which issued as U.S. Patents 3,059,004; 3,059,005; and 3,059,006, respectively, October 16, 1962. Under the conditions of these low temperatures, liquid phase carboxylic acid-producing processes, olefins having at least three carbon atoms to the molecule result in a reaction mixture in which the predominating organic acid is a secondary or tertiary carboxylic acid. The organic acids obtained will generally correspond to the compounds obtained by removing an olefinic linkage in the olefinic charge and attaching a carboxyl group (—COOH) directly to one, and a hydrogen atom to the other, of the two olefinically-unsaturated carbon atoms linked by the olefinic bond in the charge material. Propylene results in isobutyric acid; butene-1 and butene-2 in 2-methyl butyric acid; isobutylene in trimethylacetic acid; octene-1 and octene-2 in 2-methyl octanoic acid; cyclohexene in acids comprising methyl cyclopentane carboxylic acid and cyclohexane carboxylic acid; etc. Mixtures of olefins will result in the obtaining of mixtures of fatty acids having on the average one more carbon atom to the molecule than the olefinic components of the charge.

The suitable unsaturated organic charge materials from which the alpha-branched monocarboxylic acids are obtained comprise commercially available unsaturated hydrocarbons predominating in monoolefins such as, for example, propylene, butylene-1, butylene-2, isobutylene, branched or unbranched pentenes, hexenes, heptenes, octenes, nonenes, decenes and higher alkenes; polymers and copolymers of such alkenes, such as diisobutylene, propylene tetramer; cyclic alkenes, such as cyclopentene and cyclohexene. Commercially available mixtures comprising these alkenes are also used, for example, olefin-containing hydrocarbon fractions such as obtained by thermal vapor phase cracking of paraffin wax in the presence of steam. These fractions not only contain alkenes but generally also some paraffins, naphthenes and aromatics, which usually do not take part in the carboxylic acid synthesis. Olefin-rich products obtained in the Fischer-Tropsch synthesis carried out under moderate pressure also constitute examples of a suitable source of the alpha-branched monocarboxylic acids. Monoolefins generally employed in the production of the carboxylic acids comprise those having from three to twenty carbon atoms to the molecule. The resulting alpha-branched acids will therefore have from about four to about twenty-one carbon atoms to the molecule. Olefin fractions consisting of mixtures of monoolefins having, for example, from about eight to about ten carbon atoms to the molecule result in the obtaining of mixed alpha-branched carboxylic acids of nine to eleven carbon atoms of particular utility in the production of valuable derivatives.

The alpha-branched monocarboxylic acids obtained in these low temperature catalytic carboxylic acid synthesis are saturated secondary and tertiary monocarboxylic acids represented by the general formula

wherein $R^2$ represents alkyl groups and $R^1$ represents hydrogen or an alkyl group. They may further be characterized as dialkyl- and trialkyl-acetic acids of which dimethyl- and trimethyl acetic acids are the lowest members.

Characteristics inherent in, and to some extent peculiar to, the acids treated in accordance with the present invention are believed attributable at least in part to the specific method of their production. The alpha-branched saturated monocarboxylic acids obtained in the above-defined low temperature, catalytic synthesis find application in the production of valuable derivatives therefrom. Thus, they are the starting materials in the production of epoxy derivatives. As disclosed and claimed in copending application Serial No. 771,739, filed November 4, 1958, now abandoned, their salts with drier metals such as Co, Ni, etc., produce driers possessing valuable characteristics. Suitability of these acids for use in many fields of application is, however, dependent upon a relatively high degree of purity and absence of discoloration.

In the production of the crude alpha-branched monocarboxylic acids by the above-defined low temperature, catalytic synthesis there is obtained a reaction mixture comprising two liquid phases, an organic phase comprising the desired alpha-branched monocarboxylic acids and a substantially inorganic phase comprising the catalyst. Upon separating the inorganic phase there is obtained the organic phase constituting the crude alpha-branched saturated monocarboxylic acids to the treatment of which the present invention is directed. Attempts made heretofore to purify and concentrate the crude carboxylic acids by such steps as, for example, distillation, generally resulted in substantial loss of product due to decomposition of the organic acids with regeneration of olefins under the conditions of distillation. A further drawback encountered was substantial discoloration of the organic acid product.

It has now been found that decomposition and discoloration of the alpha-branched monocarboxylic acids during such distillation procedure is attributable, at least in part, to the presence therein of by-product impurities formed during the synthesis of the desired organic acids. Without intent to limit in any manner the scope of the invention by theory advanced herein to set forth more fully the nature of the invention, it is believed that a part of such by-product impurities may comprise reaction products resulting from unavoidable interaction of components in the reaction mixture with components of the materials of construction of equipment with which they are in direct contact.

In accordance with the invention the crude reaction products comprising alpha-branched saturated monocarboxylic acids obtained by the reaction of olefins with carbon monoxide and water in the presence of a catalyst selected from the group consisting of admixtures of boron trifluoride and water and admixtures of boron trifluoride, phosphoric acid and water, are purified by subjection to a treatment comprising the successive steps of the addition of a sequestering agent, washing with an alkaline solution and distillation.

Suitable sequestering agents comprise compounds which are capable of reacting substantially selectively with impurities in the alpha-branched monocarboxylic acids under the treating conditions, with the formation of complexes readily separated without adverse effect upon the alpha-branched acids by ordinary practical scale separating means comprising, for example, one or more such steps as, washing, extraction, distillation, centrifuging, filtration, etc.

Such suitable sequestering agents comprise, for example, dibasic and polybasic carboxylic acids, hydroxy acids, amino acids, alpha-acylketones, carbazones, sulfocarbazones, and derivatives thereof. Specific examples of such suitable agents comprise the di- and polybasic acids having up to eight carbon atoms, such as oxalic, malonic, glutaric, adipic, suberic acids, etc.; aliphatic amino acids, such as glycocoll; nitrilotriacetic acid $N(CH_2COOH)_3$; alkali metal salts of the acids mentioned; acetylacetone and derivatives thereof, such as thenoyl trifluoro acetone

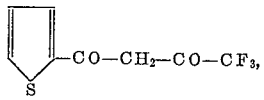

and also dithizone:

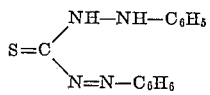

Comprised within the suitable sequestering agents are the amino acid chelating agents such as the alkylene diamine polyaliphatic saturated monobasic carboxylic acids, their alkali metal salts, etc. Specific examples of such chelating agents comprise the ethylene diamine tetracetic acid type represented by ethylenediaminetetraacetic acid; di-hydroxyethyl-ethylenediaminediacetic acid; tri-hydroxyethyl-ethylenediamineacetic acid; the alkali metal salts thereof, etc.

Agents yielding water-soluble complexes with the impurities, such as, for example, the polybasic carboxylic acids are preferred. Of these, those having a pH value of 4 or less are found to be particularly satisfactory. The alpha-hydroxy polycarboxylic acids such as, for example, citric acid are particularly preferred.

One or more of the suitable agents may be employed. The acidic agents may be used in admixture with dilute mineral acids, for example, hydrochloric acid.

The agents may be added to the crude alpha-branched saturated monocarboxylic acids as such or in the form of a solution in a suitable solvent. The solvent employed may be a mutual solvent for the added agent and the material to be treated or may dissolve essentially only the sequestering agent.

Addition of the sequestering agent is followed by contact with a suitable alkaline solution. Preferred are aqueous solutions of the alkali metal-bicarbonates, for example, aqueous sodium bicarbonate. The use of other alkaline solutions may, however, be used within the scope of the invention.

When washing with weakly alkaline aqueous liquids the pH should preferably be so adjusted that no substantial amount of the monocarboxylic acids being purified go into solution. A pH of not more than about 8 or about 8.5 is generally suitable.

If desired the treatment with the sequestering agent and the washing with the alkaline solution may be combined. To this end use is made, for example, of a solution containing both sodium citrate and sodium bicarbonate. The treatment is usually more effective, however, when both steps are carried out separately. In general, a treatment with a sequestering agent precedes a washing treatment with weakly alkaline liquid, although the order may be reversed within the scope of the invention.

The monocarboxylic acids are preferably subjected to the present treatments and washings while in a liquid state. They may be liquified by adding an organic solvent and/or increasing the temperature.

In general, the temperature employed during the treatment may be the ambient temperature, although higher temperatures, for instance from about 40° to about 100° C., may be used within the scope of the invention.

After the washing step the carboxylic acids are subjected to a distillation. Distillation is preferably carried out in vacuo, although atmospheric pressure is permissible provided the monocarboxylic acids are not kept too long at the distillation temperature.

*Example*

Crude alpha-alkyl substituted monocarboxylic acids were prepared as follows:

An olefinic fraction (obtained by thermal vapor-phase cracking of a paraffinic feedstock in the presence of steam) which consisted substantially of alkenes having from 8 to 10 carbon atoms, was partially hydrogenated to convert any dienes present to alkenes. After this hydrogenation the alkenes constituted 76% by weight of the mixture, viz. 39% by weight of straight chain, 20% by weight of branched chain and 17% by weight of cyclic alkenes. The rest of the mixture consisted essentially of saturated hydrocarbons (17% by weight) and aromatics (7% by weight).

The olefinic fraction so obtained was reacted with carbon monoxide and water in liquid phase in the presence of a catalyst consisting of $H_3PO_4$, $BF_3$ and $H_2O$ in a molar ratio of 2:3:2, respectively. The liquid contents of the reactor were maintained constant at a volume of three liters and at a constant temperature of 60° C. The olefinic charge was introduced into the reactor at the rate of 0.7 liter per hour, and the catalyst at the rate of 1.4 liters per hour. A carbon monoxide pressure of 70 atmospheres abs. was maintained in the reactor above the liquid. Vigorous stirring was maintained throughout the operation. The equipment used was made of chrome-nickel steel.

The reactor effluence was separated by stratification into an upper liquid organic phase and a lower liquid catalyst phase. The phases were separated and the organic phase was washed countercurrently with water at 40° C. in a continuous operation. The weight ratio of organic phase to wash water was 20:1. The resulting organic phase consisted of crude mixed secondary and tertiary saturated carboxylic acids (alpha-branched) having 9 to 11 carbon atoms to the molecule.

The crude mixed secondary and tertiary saturated carboxylic acids having 9 to 11 carbon atoms so obtained was divided into three equal portions herein identified as "Crude Acid A," "Crude Acid B" and "Crude Acid C," respectively.

"Crude Acid A" was distilled without further pretreatment.

"Crude Acid B" was washed with a 5% aqueous solution of sodium bicarbonate. The amount of aqueous sodium bicarbonate used was equal to 10% by volume of the crude acid treated. Contact of the crude acid with the aqueous sodium bicarbonate was maintained for five minutes at 20° C. The crude acid was then distilled.

"Crude acid C" was combined with an amount of aqueous 1% solution of sodium citrate equal to 10% of its volume. Contact with the aqueous sodium citrate was maintained at 20° C. for a period of five minutes with agitation. Thereafter the aqueous phase was separated by stratification and decantation. The treated "Crude Acid C" was then washed with aqueous sodium bicarbonate in the exact and identical procedure used for "Crude Acid B" and distilled.

The distillation of each of the three samples was carried out at a pressure of 20 mm. mercury, the boiling temperature in the still rising through the range of 140° to 165° C. The loss of monocarboxylic acids encountered in each of the three experiments during the distillation step was determined and is given in the following table:

| Run | | Citrate treat | Bicarbonate wash | Acid loss, percent |
|---|---|---|---|---|
| 1 | "Crude Acid A" | No | No | 60 |
| 2 | "Crude Acid B" | No | Yes | 6.4 |
| 3 | "Crude Acid C" | Yes | Yes | 1.1 |

The distilled products were substantially colorless in all three cases immediately after the distillation. However, "Crude Acids A and B," showed a gradual and pronounced discoloration on standing whereas "Crude Acid C" remained substantially colorless. The "Crude Acid C" proved to be markedly superior to the "Crude Acids A and B" in all respects.

We claim as our invention:

1. In a process for the purification of crude reaction products consisting essentially of alpha-alkyl substituted saturated monocarboxylic acids obtained by the reaction of mono-olefinically unsaturated hydrocarbons with carbon monoxide and water in the presence of a catalyst selected from the group consisting of admixtures of boron trifluoride and water and admixtures of boron trifluoride, water and phosphoric acid, the combination of consecutive steps consisting essentially of: (a) separating the reactor effluence into an upper liquid organic phase containing crude reaction products consisting essentially of said alpha-alkyl substituted monocarboxylic acids and a lower liquid catalyst phase, (b) separating the phases and washing the crude reaction product phase countercurrently with water in a continuous operation, (c) contacting said crude reaction products with a sequestering agent selected from the group consisting of the unsubstituted acylic saturated dicarboxylic acids having up to eight carbon atoms, citric acid and the alkali metal salts thereof at a temperature of from about 20 to 100° C., (d) separating said sequestering agent from the resulting mixture, (e) washing said crude reaction products after the removal of said sequestering agent therefrom, at a temperature of from about 20 to 100° C. with an aqueous alkali metal bicarbonate solution, (f) and distilling the the resulting washed crude reaction products.

2. A process in accordance with claim 1 wherein the sequestering agent is an alkali metal salt of citric acid.

3. A process in accordance with claim 1 wherein the sequestering agent is aqueous sodium citrate and the aqueous alkali metal bicarbonate solution is an aqueous solution of sodium bicarbonate.

References Cited by the Examiner

UNITED STATES PATENTS 2,135,457  11/38  Loder _____ 260—540
2,876,241  3/59  Koch et al. _____ 260—533 X

OTHER REFERENCES

Chaberek et al., Organic Sequestering Agents, pages 397–8 (1959).

LORRAINE A. WEINBERGER, *Primary Examiner.*

LEON ZITVER, CHARLES B. PARKER, *Examiners.*